INVENTOR
RICHARD J. FRAINIER

INVENTOR
RICHARD J. FRAINIER

BY Thomas J. O'Brien
ATTORNEY

June 14, 1960

R. J. FRAINIER 2,940,269

PROCESS AND APPARATUS FOR SEPARATING
GASEOUS MIXTURES BY RECTIFICATION

Filed Jan. 4, 1956

INVENTOR
RICHARD J. FRAINIER

BY
Thomas I. O'Brien
ATTORNEY

United States Patent Office 2,940,269
Patented June 14, 1960

2,940,269

PROCESS AND APPARATUS FOR SEPARATING GASEOUS MIXTURES BY RECTIFICATION

Richard J. Frainier, Tonawanda, N.Y., assignor to Union Carbide Corporation, a corporation of New York Filed Jan. 4, 1956, Ser. No. 557,259

16 Claims. (Cl. 62—11)

This invention relates to an improved process and apparatus for the low-temperature separation of low boiling point gas mixtures such as air, for example, into higher and lower boiling point components, and it particularly concerns improvements resulting in the continuous removal from separation systems of higher boiling impurities separated in such systems by refrigeration.

Gas mixtures containing higher boiling point impurities such as air, which contain water vapor and carbon dioxide, must be freed of such impurities when the gas mixture is to be separated into components by low temperature rectification. An economical method of eliminating these higher boiling impurities while efficiently cooling the gas mixture is to employ periodically reversed heat exchange devices having a path in which gas mixture being cooled is passed in one direction therethrough and in which separation product being warmed passes in the opposite direction therethrough when the gas mixture has ceased the flow therein, the gas mixture flow and separation product flow being periodically interchanged to effect alternate deposition along the flow path of a major part of the so-called higher boiling impurities from the gas mixture and re-evaporation of such deposited impurities into the outflowing separation product. This is of particular economy when the gas mixture does not need to be compressed to high pressures causing excessive compression energy loss from flow reversal blowdown. However, one of the difficulties that arises in the use of such periodically reversed heat exchange devices is that when the inflowing mixture and outflowing product are in balance, such higher boiling point impurities cannot normally be removed at the rate at which they are deposited in the heat exchange path and hence gradually accumulate in and block such path. To remove such accumulations, it was necessary to interrupt the operation of the plugged heat exchange device for periodic thawouts, and this resulted in undesirable refrigeration losses affecting the economy of the plant.

It is known that in such systems the temperature difference between incoming air and outgoing separation product increases toward the cold end of the heat exchange device because of the greater specific heat of the compressed air at the lower temperatures. As a result of this temperature difference, there is also such a difference in the vapor pressure of the impurities during condensation and re-evaporation that the condensate cannot be removed by outgoing product at the rate at which it was deposited. This undesirable condition can be remedied by passing a greater mass of cold outflowing gas than incoming air through at least the colder part of the heat exchange device to offset the greater specific heat of the compressed air and to reduce the temperature difference between the air and outflowing gas in the region of impurity deposition. In this way the temperature of the separation product passing through the reversing heat exchange path will be sufficiently close to the temperature of the air passed previously therethrough that it has sufficient capacity to re-evaporate all the condensate deposited therein.

It is, therefore, the object of this present invention to provide an improved system for the low temperature separation of air in which higher boiling impurities deposited in a heat exchange path during gas mixture flow therethrough can be continuously completely removed during operation of the system by outgoing separation product passed through such path when the gas mixture has ceased flowing therethrough.

In accordance with the present invention, the total mass of outwardly flowing gas in the cold end of the heat exchange device is increased by circulating a stream of vapor from a higher pressure region of the product-producing rectification stage through a non-reversing path extending along such cold end and back to the rectification at a region of lower pressure. The refrigeration supplied by the vapor stream is thus used to offset the difference in the specific heats of the air and outgoing product in the portion of the heat exchange zone where carbon dioxide deposition occurs. This reduces the cold end temperature difference and increases the capacity of the outflowing product passing through the reversing path for carbon dioxide re-evaporation, thus making the heat exchange device self-cleaning. If the composition of the withdrawn vapor is the same as the oxygen product, it can be passed through the heat exchange zone with the latter through the oxygen-product path, and then drawn off and returned to the rectification to serve as refluxing vapor.

The pressure drop present in the product-producing rectification stage may serve as the driving force required for the circulation of this stream. However, it is preferred in the practice of this invention to return the warmed vapor to a region in the rectification stage where the vapor of the rectification is of substantially the same composition as the warmed vapor. Consequently, the driving force necessary for circulating the stream is preferably obtained by throttling the vapor across a localized region of the rectification stage, such as, for example, between the rectifying zone and the oxygen liquid reboiled zone, to obtain a pressure drop corresponding to the driving force needed.

Other objects, features and advantages of the present invention will become apparent in the following description of the accompanying drawings in which.

In the drawings, similar parts in the several figures are designated by the same reference characters.

Figure 1:
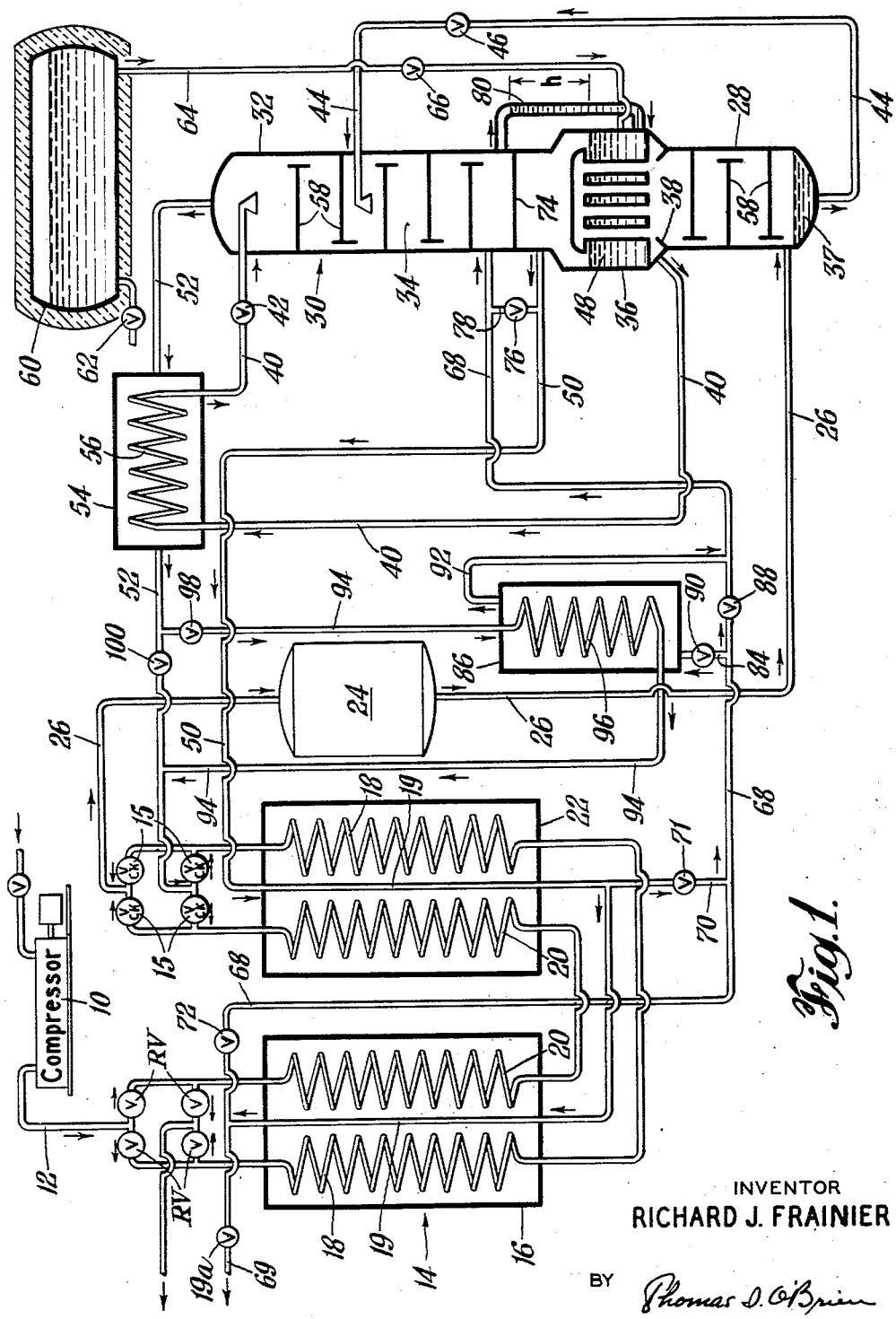
Fig. 1 is a schematic flow diagram of an air separation plant without mechanical refrigeration-producing devices, which embodies the present invention.

Referring now to Fig. 1 of the drawings, the apparatus includes a compressor 10 which preferably compresses the air to a pressure of about 70 p.s.i.g. and delivers the air into a conduit 12 leading to the warm end of a countercurrent heat exchanger generally indicated at 14. The latter has a warm leg 16 with passageways 18, 19 and 20 connected with corresponding passageways in a cold leg 22. Incoming compressed air flowing in one direction through the heat exchanger is cooled to substantially its condensation temperature by effluent nitrogen and oxygen products flowing through the heat exchanger in the opposite direction. The countercurrent flows of the compressed air and nitrogen product are periodically alternated between passageways 18 and 20 by reversing valves RV and check valves 15, so that higher boiling impurities in the air stream deposited by condensation and accumulated in solid or liquid phase on the surfaces of a passageway in which the air is flowing will be regularly removed by the effluent nitrogen during the period when it flows through the same passageway. The oxygen product is conducted through passageway 19 in the cold and warm legs of the heat exchangers 14 to recover its refrigeration without contaminating it before it is discharged for distribution to consumer means. In this system residual hydrocarbon impurities and particles of residual carbon dioxide not deposited in the heat exchanger are removed from the air stream by an adsorbent trap 24 disposed in a conduit 26 leading from the cold end of the heat exchanger 14 to a high pressure column 28 of a two-stage rectification column indicated generally at 30.

The air rectification apparatus may be of customary construction and, in addition to the high pressure rectification or lower column 28, includes an upper, low pressure rectification column 32 having a rectifying section 34 and a reboiler section 36 at the lower end thereof which closes the high pressure column 28 and separates it from the upper column. The reboiler 36 operates in a customary manner to condense vapors rising in column 28, producing reflux for the high pressure column and also liquid nitrogen that is collected on a shelf 38 directly under part of the reboiler 36. The liquid nitrogen from the shelf 38 is throttled to a lower pressure and passed to the top of the upper column through a conduit 40 having a throttle valve 42. Oxygen-enriched liquid collected in a "kettle" 37 of the lower column is transferred to an intermediate part of the upper column 32 through a conduit 44, the higher pressure liquid being throttled to a low pressure by throttle valve 46 in conduit 44 before it is delivered into the upper column. The liquids transferred to the upper column provide reflux and are further rectified to obtain a cold, gaseous nitrogen product at the top part thereof and an oxygen product of desired purity at the lower part thereof. Oxygen-enriched liquid falling from the lowermost tray of the upper column passes into a liquid oxygen collecting space 48 of the reboiler 36 wherein it is vaporized by heat exchange with condensing fluid on the tube side of the reboiler. Part of this vapor is withdrawn from the rectification apparatus as oxygen-make product through conduit 50, and the remainder is passed into the rectifying section 34 to provide refluxing vapor for the low pressure rectification. The nitrogen product of the rectification is withdrawn from the upper column 32 to a conduit 52, which delivers the cold, gaseous effluent to check valves 15 at the cold end of the countercurrent heat exchanger 14. The nitrogen product may be passed through a heat exchanger 54 disposed in conduit 52 to superheat the nitrogen effluent and at the same time subcool the shelf nitrogen liquid sufficiently to minimize flash-off when it is throttled to a lower pressure in valve 42. The recification chambers 28 and 34 may be provided with the usual gas and liquid contact surfaces, such as trays 58.

The rectification system of Fig. 1 does not have a specific mechanical refrigeration-producing device, and the low temperature refrigeration needed for operation is obtained from a body of a low temperature liquid, preferably liquid oxygen, which is stored in an efficiently insulated tank 60 and from which liquid is fed to the air separating plant. The liquid oxygen employed for this use may be shipped to the plant in liquid form and is introduced into the tank 60 through a liquid inlet connection 62. It will be understood that all the liquid oxygen shipped to the plant is used to furnish gaseous oxygen. However, by utilizing the refrigeration in the liquid to operate the air separation plant, a larger amount of oxygen can be produced than the amount produced by just evaporating liquid oxygen in storage tank 60.

The tank 60 is preferably situated at a higher elevation than the rectifying column, as shown in Fig. 1, so that gravity flow may be employed for draining liquid through the bottom of the storage tank to the rectification column. Tank liquid is delivered by a conduit 64 having a control valve 66 therein from tank 60 to the reboiler chamber reservoir or collecting space 48, where it is reboiled along with the oxygen-rich liquid in such space. Various other schemes for feeding liquid from the storage tank to the reboiler may also be used. For example, tank 60 may be positioned at a lower elevation than reboiler 36, providing a sufficient pressure differential is maintained between the tank and the reboiler for effecting transfer of liquid from the tank to the reboiler.

The oxygen product of rectification and the liquid oxygen addition from storage tank 60, which boil in reboiler space 48, produce cold, gaseous oxygen that is conducted by conduit 50 to the non-reversing passageway 19 for passage through the cold and warm legs of the heat exchanger 14. In this way refrigeration in the oxygen product is recovered by the incoming air passing through the heat exchanger in a direction countercurrent to the oxygen flow without contaminating the oxygen product. A valve 19a regulates the amount of oxygen withdrawn from the system.

In order to increase the mass of outgoing cold product in excess of the mass of the incoming air, in accordance with the principles of this invention, and thereby reduce the temperature difference between the incoming air and the outgoing purging nitrogen product in the colder regions of the heat exchanger 14, a cold gas from the low pressure rectification stage 32 is circulated from a higher pressure region of such stage through such colder regions and is then returned to the rectification at a lower pressure region to serve as part of the refluxing vapor therein. It is preferable to return the warmed gas after passage through the heat exchange to a region of the rectification where the composition of the warmed vapor is similar to that of the cold vapor in the rectification. This is accomplished by imposing a vapor flow restriction across the rectification column 32 to set up a pressure drop which may be utilized to effect the circulation of vapor from the column through the heat exchanger and back to the column at substantially the withdrawal region.

In the preferred embodiment of Fig. 1, the vapor stream to be circulated through the heat exchanger for unbalancing the thermal conditions therein has the same composition as the oxygen product and may be withdrawn therewith from the rectification column 32 through the oxygen-make conduit 50 and passed through the non-reversing passageway 19 of the heat exchanger 14, a part of the oxygen vapor being returned to the column by way of return conduit 68 and the rest passing by way of conduit 69 to an oxygent supply line (not shown). The vapor to be returned to the rectification may be diverted into the return conduit 68 after passage through the cold leg 22 of the heat exchanger 14 by way of a branch line 70 having a shut-off valve 71 therein, or with valve 71 closed, it may be passed through both legs of the heat exchanger and diverted into return conduit 68 at the warm end of the heat exchanger 14. Valve 72 in conduit 68 is open for this flow condition and closed in the case where the vapor is returned after passage through the cold leg only.

The vapor to be returned to the rectification is preferably recooled by heat exchange with some colder fluid in the system. For example, as is shown in Fig. 1, part or all of the returning vapor may be diverted into a heat exchanger 86 by suitable regulation valves 83 and 90 in return conduit 68 and branch conduit 84, respectively, for passage therethrough in heat exchange with effluent nitrogen and thence through conduit 92 to the return conduit 68. A branch conduit 94 off the effluent nitrogen conduit 52 conducts nitrogen to heat exchange pass 96 and thence back to conduit 52. Valves 98 and 100 in branch conduit 94 and effluent nitrogen conduit 52 are regulated to provide a suitable amount of cold nitrogen for recooling the return vapor. This also effects additional recovery of refrigeration from the effluent nitrogen.

In order to provide a driving force for circulating the excess vapor withdrawn from column through the heat exchanger 14 and back to the column, a diaphragm 74 is positioned across the column between the rectifying section 34 and the reboiler section 36 and vapor from the reboiler section 36 is throttled through a valve 76 in a conduit 78 which, together with part of conduit 50 and part of conduit 68, forms a by-pass around diaphragm 74 for delivering refluxing vapor from the reboiler 36 to the rectifying section 34. The pressure difference across the throttling valve 76 is supported by the hydrostatic head "$h$" in oxygen liquid transfer conduit 80 which conveys descending liquid from the rectification to below the liquid level in the reboiler for re-evaporation. It will be apparent that the maximum head available for any one column will be limited by the elevation of the diaphragm relative to the reboiler 36, such relative elevations determining the height of the liquid transfer line 80 and consequently the maximum head permissible in any one rectification column.

Figure 2:
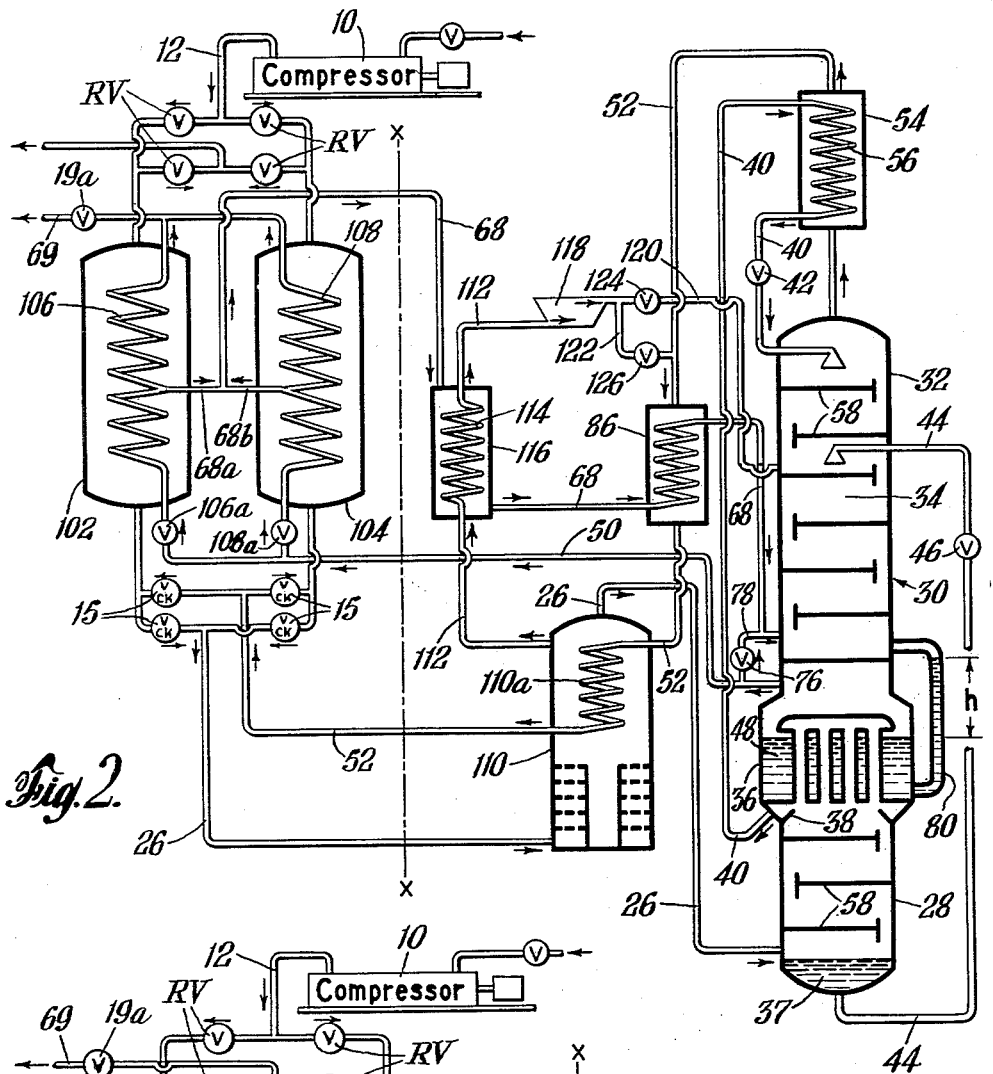
Fig. 2 is a schematic flow diagram of a modified air separating system including mechanical refrigeration-producing means and embodying this invention.

It will be noted that this method of thermal unbalancing the heat exchanger for providing complete cleaning thereof by outgoing product is especially suited to systems employing added liquid oxygen for low temperature refrigeration requirements. This is because there is already present in such system some degree of unbalance resulting from the increase in the mass of outgoing product over that of the incoming air represented by the liquid addition to the plant. For this reason a reduced amount of vapor from the low pressure rectification stage is required to be circulated through the heat exchanger for unbalance purposes. This minimizes power costs resulting from the additional expenditure required to drive the vapor through the heat exchanger and back to the rectification. Such a method of unbalance is, however, by no means limited to systems without mechanical refrigeration-producing mechanisms. Fig. 2 shows an air separation plant similar to that of Fig. 1 wherein a portion of the compressed air stream is work-expanded to produce the low temperature refrigeration requirements of the plant and wherein a stream of cold vapor from the rectification column is circulated through a heat exchange device in much the same manner as the unbalance vapor stream of Fig. 1.

Figure 3:
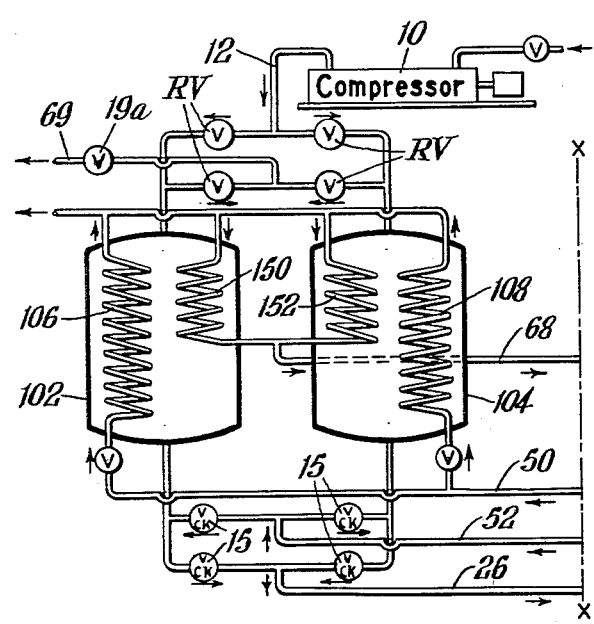
Fig. 3 is a fragmentary flow diagram showing modified heat exchange means which can be substituted for the heat exchange means shown to the left of the dot and dash line on Fig. 2.

The apparatus of Figs. 2 and 3 is similar to that of Fig. 1 in respect to the elements designated by the same reference characters, but differs in the provisions for recovering refrigeration from outgoing products and for producing the refrigeration requirements. Thus in Fig. 2 a pair of switching regenerators 102 and 104 are employed in place of heat exchangers for cooling incoming air with outgoing products. Compressed air in supply line 12 is passed alternately by reversing valves RV through regenerators 102 and 104, with the off-air-stream regenerator being cooled and purged by outflowing nitrogen product. Outgoing oxygen product is preferably divided and passed in continuous flow through both regenerators in passages 106 and 108. Air which has been freed of moisture and carbon dioxide in the regenerators is conducted by conduit 26 to the lower part of a scrubber separator 110, wherein it is washed by liquid air to scrub out residual hydrocarbon impurities and any particles of residual carbon dioxide. Clean vapor is conducted by conduit 26 from the upper part of the scrubber 110 to the lower end of the high pressure rectification column 28. Part of the vapor in the scrubber is liquefied by heat exchange with effluent nitrogen passing through a liquefying coil 110a in the upper part of the scrubber. Part of the clean air in the scrubber 110 is passed through a work expander circuit to provide the low temperature refrigeration requirements of the plant. Such air is conducted by a conduit 112 to a pass 114 in a heat exchanger 116 wherein it is heated prior to its expansion in a turbine 118 so as to provide efficient production of refrigeration by expansion with external work. Work-expanded air may be selectively passed either to the upper rectification column 32 by way of conduit 120 or to the nitrogen effluent conduit 52 by way of conduit 122, valves 124 and 126 being provided respectively in conduits 120 and 122 to effect the desired flow.

The rectification operation of Figures 2 and 3 is similar to that of Fig. 1 and is believed clear from the foregoing description. However, in Fig. 2, the oxygen vapor used for unbalancing the thermal conditions in the regenerator for providing complete cleaning by outgoing nitrogen product may be drawn from an intermediate part of the oxygen-make passageways 106 and 108 through branch connections 68a and 68b of return conduit 68 and employed for warming the air to be work-expanded before being returned to the rectification zone. To this end return conduit 68 conducts return oxygen vapor to heat exchanger 116 for passage therethrough in heat exchange relation with air in coil 114. The oxygen vapor is simultaneously recooled as it removes refrigeration from the clean air. Such vapor may be further cooled by removing refrigeration from the nitrogen effluent in heat exchange 86 before delivery into the rectification zone.

Although it has been described that the outgoing oxygen stream is split and passed through both regenerators, it should be understood that all of the outgoing oxygen could be passed in a single stream alternately through one regenerator and then the other, either in phase in the switching cycle of the nitrogen and air or out of phase therewith. For example, the outgoing oxygen stream can be passed through each regenerator during the last half of the air-on-flow half cycle. For these purposes there is provided control valves 106a and 108a, the opening and closing of which may be timed to effect any desired oxygen flow.

It will be seen in Fig. 3 that, instead of diverting return vapor from an intermediate part of the oxygen-make passageways 106 and 108, the same thermal result can be obtained by passing excess oxygen vapor completely through the regenerators with the oxygen make product and then conducting the excess through the warm end portions of the regenerators in another heat exchange pass in concurrent relation with incoming air. In this way the incoming and outgoing gas flows are again balanced in the warm end portions of the regenerators and there is desired excess outgoing product flow only through the cold end portions when carbon dioxide deposition occurs. To this end there are provided coils 150 and 152 which extend through the warm end portions of regenerators 102 and 104, respectively. Coils 150 and 152 are connected at the warm ends of the regenerators to the oxygen make line 69 and at intermediate parts of the regenerators to the oxygen vapor return conduit 68.

Figure 4:
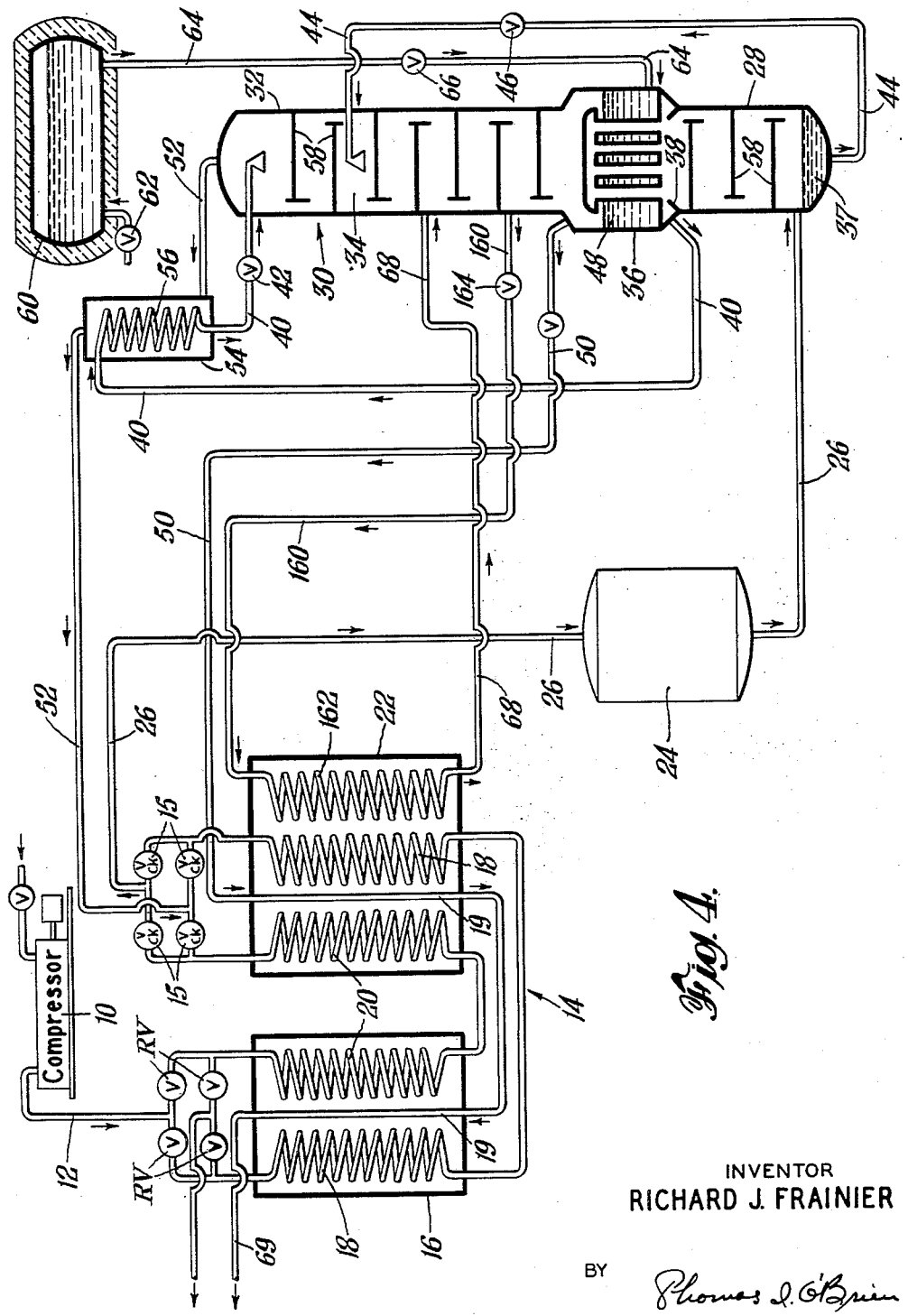
Fig. 4 is a schematic flow diagram of an air separation system similar to Fig. 1 with certain modifications.

Referring now to the embodiment of Fig. 4, which is in many respects similar to the air separation plant of Fig. 1, it will be seen that the unbalance vapor circuit lacks means for setting up a specific pressure differential in the rectification column to serve as a driving force for the circulated vapor, and instead, uses the pressure differential already available in the low pressure column. The unbalance vapor circuit also differs from that of Figs. 1, 2 and 3 in the provision of a separate heat exchange path in the heat exchanger used solely for unbalance flow. It should be understood, however, that the separate path could be used with a system employing a specific pressure differential producing device in the rectification column for the unbalance circuit and, as a corollary, that the pressure differential already existing in the rectification column could also be used with an unbalance circuit using the oxygen make passageway of the heat exchange device.

In Figure 4, vapor is withdrawn from a lower region of the rectification column 32 and is conducted by a conduit 160 to one end of a closed pass 162 extending through the cold leg 22 of heat exchanger 14. The other end of pass 162 is connected by return conduit 68 to a region above the point of vapor withdrawal where the pressure is lower than that of such lower region. Valve 164 in conduit 160 regulates the amount of upper column vapor circulated through the cold leg of the heat exchanger for unbalance.

Figure 5:
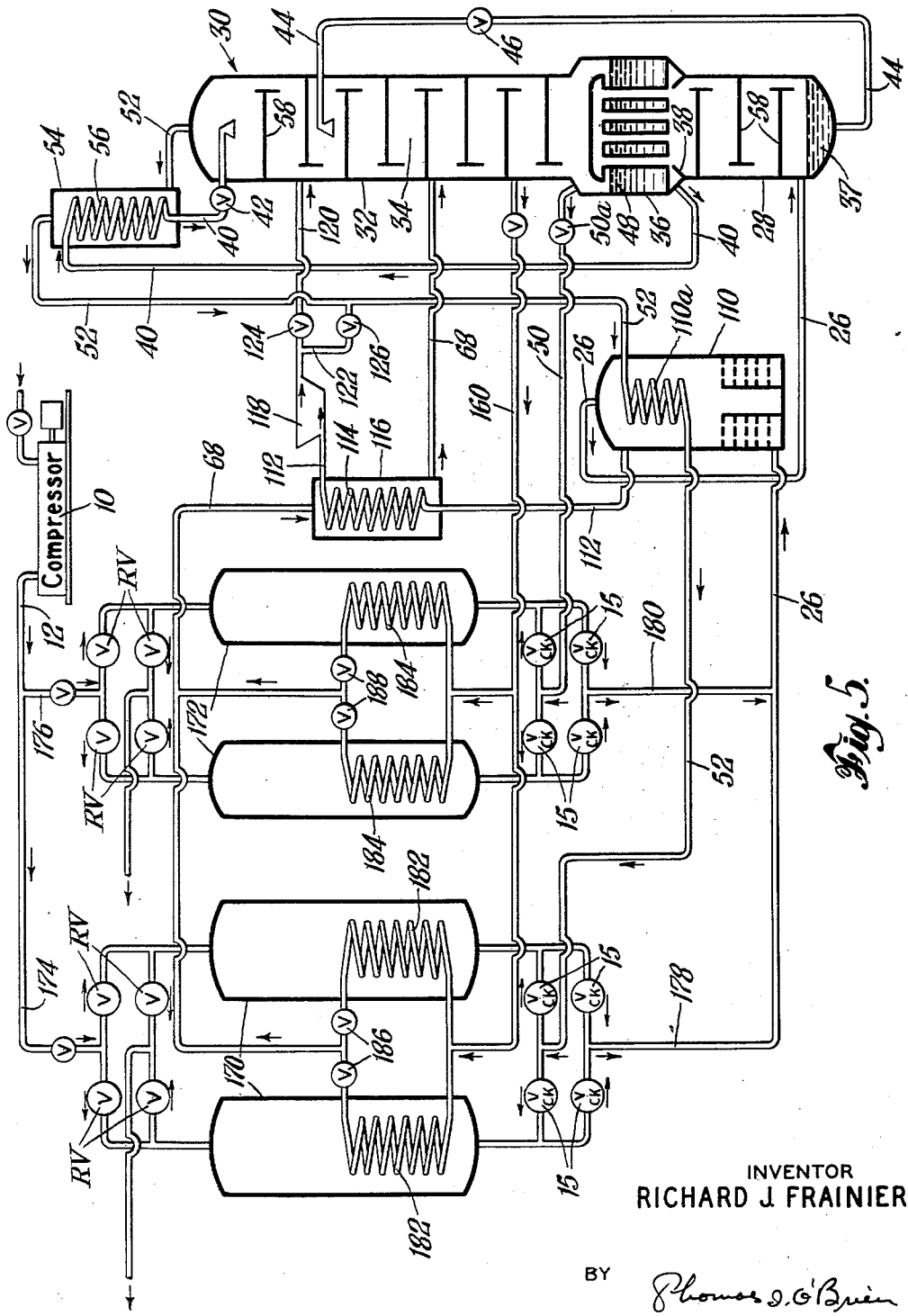
Fig. 5 is an air separation system similar to Fig. 2 with certain modifications.

The embodiment of Fig. 5 illustrates the application of the principles of this invention to an air separation system wherein low purity oxygen gas is made. Alternately reversed pairs of regenerators 170 and 172 are employed, the pair of regenerators 170 being cooled by outflowing nitrogen product and the regenerators 172 being cooled by outflowing oxygen product. Compressed air is conducted to the warm ends of the regenerators by supply line 12 having branch conduits 174 and 176 which connect with the respective reversing valves at the warm ends of regenerators 170 and 172, respectively. Sets of check valves 15 at the cold ends of the regenerators discharge the cooled and cleaned air to branch conduits 178 and 180 connecting to conduit 26 which delivers the air into the lower end of scrubber separator 110. The air is thereafter treated in the same manner as described with reference to Fig. 2. However, here the nitrogen product of rectification, which passes through heat exchanger 54 and coil 110a in the upper part of the scrubber after leaving chamber 34, is conducted by conduit 52 to the valve system 15 at the cold end of the regenerators 170 for passage alternately with incoming air through each regenerator of the pair. The oxygen make product is conducted by a conduit 50 controlled by valve 50a to the valve system 15 at the cold end of regenerators 172 for passage alternately with incoming air through each regenerator of the pair.

The unbalance in the regenerators 170 and 172 is effected by cold coils 182 and 184 in the colder regions of regenerators 170 and 172, respectively, for the unbalance vapor cannot use the oxygen path in a system where the oxygen is used to remove impurities deposited during air flow through the same path. For that reason a closed circuit is employed comprising a withdrawal conduit 160, coils 182 and 184, and a return conduit 68. Accordingly, vapor from the rectification column 32 can be circulated through the cold ends of the regenerators 170 and 172 without being contaminated and can be returned to the column for use as refluxing vapor. The phase relation of the unbalance flow through each pair of regenerators can be controlled by valves 186 and 188 in the branch conduits connecting coils 182 and 184 with return conduit 68 in the same manner as described in reference to Fig. 2.

It will be understood that vapor withdrawal from and return to the upper column for thermally unbalancing the heat exchange device does not have to be made in the region of the column where vapor is richer in oxygen. It may also be made in the upper part of the column where the rectification vapor is richer in nitrogen. Obviously, in such case, passage would not be made through the oxygen product passage of the heat exchange device, as in Figures 1, 2 and 3, but could be made, for example, in a closed circuit, as in Figs. 4 and 5, so as to prevent contamination of the vapor returned to the column.

It will be understood that changes in the details of the systems herein disclosed may be made without departing from the scope of the invention as defined in the following claims.

What is claimed is:

1. In a process for the low-temperature separation of a gas mixture by rectification in which such gas mixture freed of high boiling point impurities and at condensation temperature is subjected to a rectification wherein a higher boiling product and a lower boiling product are produced, said rectification including at least one rectification stage, said products being used to cool further portions of gas mixture in a heat exchange zone having a reversing flow path through which gas mixture flow and outflowing product flow are periodically interchanged to effect removal by outgoing product of impurities precipitated and deposited in such path during gas mixture flow therethrough; the improvement comprising withdrawing vapor from a first region of said one rectification stage, passing withdrawn vapor through another, separate path extending at least along a colder portion of said heat exchange zone, and returning at least a part of said vapor after passage through said separate path to said same one stage of said rectification at a region of lower pressure than said first region for subsequent passage through the remainder of said stage as rectification vapor, the withdrawing, passing, and returning of said vapor thereby being effected by the pressure differential existing within said one rectification stage between said first and second regions.

2. A process as defined in claim 1 including the step of effecting separate, subsequent heat exchange between that part of the vapor returned to said one stage and a colder fluid in the process prior to the introduction of said vapor into said one stage.

3. A process as defined in claim 1 wherein said heat exchange zone includes, in addition to the above-mentioned flow paths, a non-reversing flow path through which said higher boiling product flows.

4. In a process for the low-temperature separation of a gas mixture by rectification in which such gas mixture freed of higher boiling point impurities and at condensation temperature is subjected to a rectification including at least one rectification stage wherein a higher boiling product and a lower boiling product are produced and wherein higher boiling component liquid is reboiled at a lower region of said one rectification stage and vapor resulting therefrom is passed upwardly through said stage as rectification vapor, said products being used to cool further portions of gas mixture in a heat exchange zone having a reversing flow path through which gas mixture flow and outflowing product flow are periodically interchanged to effect removal by outgoing product of impurities precipitated and deposited in such path during gas mixture flow therethrough; the improvement comprising wihtdrawing vapor from the reboiling zone of said one rectification stage, passing withdrawn vapor through another, separate path extending at least along a colder portion of said heat exchange zone, and returning at least a part of said vapor after passage through said separate path to said same one stage of said rectification at a second region in said stage above the reboiling region for subsequent passage through the remainder of said stage as rectification vapor, the withdrawing, passing, and returning of said vapor thereby being effected by the pressure differential existing within said one rectification stage between said two regions.

5. In a process for low-temperature separation of a gas mixture by rectification in which such gas mixture freed of higher boiling point impurities and at condensation temperature is subjected to a rectification including at least one rectification stage wherein a higher boiling product and a lower boiling product are produced and wherein higher boiling component liquid is reboiled at a lower region of said one rectification stage and vapor resulting therefrom is passed upwardly through said stage as rectification vapor; said products being used to cool further portions of gas mixture in a heat exchange zone having reversing flow path through which gas mixture flow and outflowing product flow are periodically interchanged to effect removal by outgoing product of impurities precipitated and deposited in such path during gas mixture flow therethrough; the improvement comprising imposing a flow restriction on at least part of the vapor resulting from said reboiling in its passage upwardly through said stage, providing a free by-pass around said flow restriction for downwardly flowing higher boiling component liquid to be reboiled, withdrawing vapor from said one stage at a point below said restriction, passing withdrawn vapor through another, separate path extending at least along a colder portion of said heat exchange zone, and returning at least a part of the vapor passed through said separate path to said same one stage of said rectification at a point above said flow restriction for subsequent passage through said stage as rectification vapor, the withdrawing, passing, and returning of said vapor thereby being effected by the pressure differential existing across said flow restriction.

6. In a process for the low-temperature separation of air by rectification in which air freed of moisture and carbon dioxide and at condensation temperature is subjected to a rectification wherein oxygen and nitrogen products are produced, said rectification including at least one rectification stage, said products being used to cool further portions of air in a heat exchange zone having a reversing flow path through which air flow and outgoing nitrogen product flow are periodically interchanged to effect removal by outgoing nitrogen product of moisture and carbon dioxide precipitated and deposited in such path during air flow therethrough; the steps of supplying from a body of cold liquid separate from the rectification low-temperature refrigeration required for such process in excess of that obtained by pretreatment of said air including said cooling by such products; increasing the mass quantity of outflowing product flow over that of incoming air flow at least along a colder portion of said heat exchange zone by withdrawing vapor from a first region of said one rectification stage, passing withdrawn vapor, together with gas product resulting from such evaporation of said cold liquid, through another separate path extending at least along said colder portion of said heat exchange zone; and returning at least a part of the material passed through said separate path to said same one stage of said rectification at a region of lower pressure than said first stage for subsequent passage through the remainder of said stage as rectification vapor, the withdrawing, passing, and returning of said vapor thereby being effected by the pressure differential existing within said one rectification stage between said two regions.

7. In a process for the low-temperature separation of air by rectification in which air freed of moisture and carbon dioxide and at condensation temperature is subjected to a rectification wherein oxygen and nitrogen products are produced, said rectification including at least one rectification stage, said products being used to cool further portions of air in a heat exchange zone having a reversing flow path through which air flow and outgoing nitrogen product flow are periodically interchanged and a non-reversing flow path through which outgoing oxygen product vapor flows; the improvement comprising withdrawing vapor from a first region of said one rectification stage, delivering such vapor into the non-reversing flow path in said heat exchange zone, returning oxygen vapor in excess of the oxygen product after passage along at least the colder portion of said heat exchange zone to said same one stage of said rectification at a region of lower pressure than said first region for subsequent passage through the remainder of said stage as rectification vapor, the withdrawing, passing, and returning of said vapor thereby being effected by the pressure differential existing within said one rectification stage between said two regions.

8. A process as defined in claim 7 wherein said excess oxygen vapor passes to the warm end of said non-reversing path, including passing the excess oxygen vapor after passage through said non-reversing path through a separate path in said heat exchange zone in countercurrent heat exchange with outgoing product flow along a warm portion of said heat exchange zone prior to returning such vapor to said one stage of said rectification.

9. In a process for the low-temperature separation of air by rectification in which air freed of moisture and carbon dioxide and at condensation temperature is subjected to a rectification wherein oxygen and nitrogen products are produced, said rectification including at least one rectification stage, said products being used to cool further portions of air in a heat exchange zone comprising at least two periodically reversed regenerators, each having a reversing flow path through which air flow and outgoing flow are periodically interchanged, the nitrogen product passing through the reversing flow path of one regenerator simultaneously with air flow through that of the other regenerator, and each having another, separate flow path extending at least along a colder portion thereof, the improvement comprising withdrawing vapor from a first region of said one rectification stage, passing withdrawn vapor through said separate path of at least one of the regenerators, returning at least part of said vapor after passage along at least the colder portion of the regenerator to said same one stage of the rectification at a region of lower pressure than that of said first region for subsequent passage through the remainder of said stage as rectification vapor, the withdrawing, passing, and returning of said vapor thereby being effected by the pressure differential existing within said one rectification stage between said two regions.

10. Apparatus for separating a gas mixture by low-temperature rectification, including heat exchange means for cooling with outflowing product the gas mixture to be separated, said heat exchange means having first passage means through which gas mixture flow and outgoing product flow are periodically interchanged and second passage means extending at least along a colder portion thereof, a rectification unit including at least one rectifying column, said column having a pressure gradient, the lower portion having a higher pressure than the upper regions thereof, means for withdrawing vapor from one region of said column for introduction into said second passage means, and means for returning at least part of the withdrawn vapor after passage through said second passage means to said column at a slightly lower pressure region above said first region for subsequent passage through the remainder of said column as rectification vapor, the small difference in pressure between said two regions being sufficient to effect the passage of said vapor through said second passage means and back to said column.

11. Apparatus for separating a gas mixture by low-temperature rectification, including heat exchange means for cooling with outflowing product the gas mixture to be separated, said heat exchange means having first passage means through which gas mixture flow and outgoing product flow are periodically interchanged, a second passage means extending at least along a colder portion thereof, a rectification unit including a rectifying column having a rectifying section wherein a higher boiling product and a lower boiling product are produced, said column having a pressure gradient, the lower portion having a higher pressure than the upper regions thereof, a boiling section at the lower end of said column for receiving component liquid flowing downwardly in said rectifying section and for vaporizing at least portions thereof for passage upwardly through the column as rectification vapor, flow restriction means in said column in the path of upward flow of said rectification vapor, means for withdrawing vapor from a point above said boiling section of said column and below said flow restriction means for introduction into said second passage means, and means for returning at least part of the withdrawn vapor passed through said second passage means to the rectifying section of said column above said flow restriction means for subsequent upward passage through the remainder of the column rectifying section as rectification vapor, said flow restriction means providing a pressure drop thereacross sufficient to effect the passage of said withdrawn vapor through said second passage means and back to the column.

12. Apparatus for separating a gas mixture by low-temperature rectification including heat exchange means for cooling with outflowing product the gas mixture to be separated, said heat exchange means having first passage means through which gas mixture flow and outgoing product flow are periodically interchanged and second passage means extending at least along a colder portion thereof, a rectification unit including a rectifying column having a rectifying section, and a reboiler section in the lower end thereof connected to receive liquid component flowing downwardly in the column and for at least partially vaporizing the same to produce rectification vapor for the column, a flow preventer in said column and a throttle valve containing bypass conduit around said flow preventer for controlling flow of part of the rectification vapor from the reboiler section to the rectifying section of said column to provide a predetermined pressure gradient between the reboiler and rectifying sections of the column, a liquid connection opening at one end to the column rectifying section above the flow preventer and at its other end below the liquid level in said reboiler section for passing downwardly flowing component liquid by gravity flow from the rectifying section around the flow preventer and into said reboiler section, means for withdrawing vapor from a point above said reboiler section and below the flow preventer for introduction into said second passage means and means for returning at least a part of the withdrawn vapor passed through said second passage means to said column rectifying section above said flow preventer for subsequent passage through the column as part of the rectification vapor.

13. Apparatus as defined in claim 11 wherein said flow restriction means comprises a diaphragm disposed within and across said column between the rectifying section of the column and said boiling section, gas connection for passing vapor around said diaphragm from said boiling section to the rectifying section of the column, said gas connection having a throttle valve therein for providing and controlling a predetermined pressure drop across said diaphragm, and liquid connection for passing downwardly flowing liquid by gravity flow from said rectifying section around said diaphragm and into said boiling section.

14. A process as defined in claim 9, in which the periodic time of flow of said vapor through said separate flow path in any one regenerator is concurrent and coextensive with nitrogen product flow through the same regenerator.

15. A process as defined in claim 9, in which the periodic time of flow of said vapor through said separate flow path in any one regenerator is concurrent and coextensive with air flow through the same regenerator.

16. A process as defined in claim 9, in which the periodic time of flow of said vapor through said separate flow path of any one regenerator takes place during the last part of the period of air flow through the same regenerator and the first part of the period of nitrogen product flow through such regenerator.

References Cited in the file of this patent

UNITED STATES PATENTS

| | | |
|---|---|---|
| 2,209,748 | Schlitt | July 30, 1940 |
| 2,480,094 | Anderson | Aug. 23, 1949 |
| 2,513,306 | Garbo | July 4, 1950 |
| 2,514,921 | Yendall | July 11, 1950 |
| 2,519,892 | Dennis | Aug. 22, 1950 |
| 2,537,044 | Garbo | Jan. 9, 1951 |
| 2,537,046 | Garbo | Jan. 9, 1951 |
| 2,552,558 | Jenny | May 15, 1951 |
| 2,619,810 | Rice | Dec. 2, 1952 |
| 2,663,168 | Schilling | Dec. 22, 1953 |
| 2,664,718 | Rice | Jan. 5, 1954 |
| 2,673,456 | Scharmann | Mar. 30, 1954 |
| 2,715,323 | Johnson | Aug. 16, 1955 |